(12) United States Patent
Li et al.

(10) Patent No.: US 10,471,821 B2
(45) Date of Patent: Nov. 12, 2019

(54) ELECTRIFIED MULTIPLE SPEED RATIO TRANSMISSION

(71) Applicant: GM Global Technology Operations LLC, Detroit, MI (US)

(72) Inventors: Dongxu Li, Troy, MI (US); Leonid Basin, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 114 days.

(21) Appl. No.: 15/822,774

(22) Filed: Nov. 27, 2017

(65) Prior Publication Data

US 2019/0161072 A1    May 30, 2019

(51) Int. Cl.
  *B60K 6/48* (2007.10)
  *B60K 6/543* (2007.10)
  *B60K 6/547* (2007.10)

(52) U.S. Cl.
  CPC .............. *B60K 6/48* (2013.01); *B60K 6/543* (2013.01); *B60K 6/547* (2013.01); *B60K 2006/4816* (2013.01); *B60K 2006/4825* (2013.01)

(58) Field of Classification Search
  CPC ... B60K 6/46; B60K 6/543; B60K 2006/4816
  See application file for complete search history.

(56) References Cited

U.S. PATENT DOCUMENTS

| | | | | |
|---|---|---|---|---|
| 5,513,719 A | * | 5/1996 | Moroto | B60K 6/24 180/65.21 |
| 5,562,565 A | * | 10/1996 | Moroto | B60K 6/26 180/65.6 |
| 6,887,180 B2 | * | 5/2005 | Pels | B60K 6/36 477/3 |
| 8,328,674 B2 | * | 12/2012 | Swales | B60K 6/365 475/151 |
| 8,457,847 B2 | * | 6/2013 | Li | B60K 6/48 475/86 |
| 8,494,729 B2 | * | 7/2013 | Li | B60K 6/48 180/197 |
| 8,777,811 B2 | * | 7/2014 | Suzuki | B60K 6/445 477/109 |
| 9,121,492 B2 | * | 9/2015 | Schoenek | B60K 6/48 |
| 9,377,084 B2 | * | 6/2016 | Li | B60K 17/08 |

(Continued)

*Primary Examiner* — David R Morris
(74) *Attorney, Agent, or Firm* — Quinn IP Law

(57) ABSTRACT

An electrified multiple speed ratio transmission for mounting to an external power-source and transmitting a power-source torque therefrom includes an input member configured to receive the power-source torque. The transmission also includes a torque transfer system configured to receive the power-source torque from the input member and select an input-to-output speed ratio of the transmission. The transmission additionally includes an electric motor operatively connected to the torque transfer system and configured to apply an electric motor torque input thereto. Furthermore, the transmission also includes an output member operatively connected to the torque transfer system and configured to receive the power-source torque and the electric motor torque input therefrom and output a sum of the power-source torque and the electric motor torque input to drive a load. A vehicle having such an electrified multiple speed ratio transmission is also envisioned.

16 Claims, 7 Drawing Sheets

(56) References Cited

U.S. PATENT DOCUMENTS

| | | | |
|---|---|---|---|
| 9,772,028 B2* | 9/2017 | Schoenek | B60K 6/48 |
| 10,247,292 B2* | 4/2019 | Kao | F16D 13/00 |
| 2002/0177504 A1* | 11/2002 | Pels | B60K 6/36 |
| | | | 477/3 |
| 2011/0179890 A1* | 7/2011 | Swales | B60K 6/365 |
| | | | 74/6 |
| 2012/0078475 A1* | 3/2012 | Li | B60K 6/48 |
| | | | 701/51 |
| 2012/0078476 A1* | 3/2012 | Li | B60K 6/48 |
| | | | 701/51 |
| 2012/0094800 A1* | 4/2012 | Suzuki | B60K 6/445 |
| | | | 477/3 |
| 2012/0178568 A1* | 7/2012 | Schoenek | B60K 6/48 |
| | | | 475/5 |
| 2015/0354671 A1* | 12/2015 | Schoenek | B60K 6/48 |
| | | | 475/5 |
| 2016/0033011 A1* | 2/2016 | Li | B60K 17/08 |
| | | | 475/269 |
| 2018/0045290 A1* | 2/2018 | Kao | F16D 13/00 |

* cited by examiner

ELECTRIFIED MULTIPLE SPEED RATIO TRANSMISSION

INTRODUCTION

The disclosure relates to an electrified multiple speed ratio transmission for a motor vehicle.

Modern motor vehicles frequently employ a powertrain that includes a power-source, such as an internal combustion engine, a multiple speed ratio, automatically-shiftable or automatic transmission, and a differential or final drive. Such an automatic transmission may provide selection of discrete speed ratios and employ either planetary or parallel gearing, or be configured as a continuously variable transmission (CVT).

To produce a more motor efficient vehicle, hybrid vehicle powertrains combine an electric motor and an internal combustion engine. Torque from the engine and the electric motor is typically channeled to the vehicle's driven wheels via the automatic transmission. Efficiency of a hybrid vehicle powertrain is generally related to the percentage of time that the engine must be run in addition to or in place of the electric motor for powering the vehicle.

Some hybrid powertrains employ a single electric motor in combination with the engine. In such powertrains, transmission output, as well as vehicle speed, is directly related to the speeds and torques of the engine and the electric motor. Other hybrid powertrains employ multiple electric motors in combination with the engine to power the vehicle. Such electric motor(s) may be mounted inside the automatic transmission, or be arranged external to the transmission to apply the respective motor torque either upstream of the input or downstream of the output of the transmission.

SUMMARY

An electrified multiple speed ratio transmission for mounting to an external power-source and transmitting a power-source torque therefrom includes an input member configured to receive the power-source torque. The transmission also includes a torque transfer system configured to receive the power-source torque from the input member and select an input-to-output speed ratio of the transmission. The transmission additionally includes an electric motor operatively connected to the torque transfer system and configured to apply an electric motor torque input thereto. Furthermore, the transmission also includes an output member operatively connected to the torque transfer system and configured to receive the power-source torque and the electric motor torque input therefrom and output a sum of the power-source torque and the electric motor torque input to drive a load.

The transmission may also include a transmission housing configured to retain and support the torque transfer system. In such an embodiment, the electric motor may be mounted to the transmission housing.

The torque transfer system may include a gear-train and a torque transmitting device having a torque transmitting device housing. In such an embodiment, the electric motor may be operatively connected to and configured to apply the electric motor torque input to the torque transmitting device housing.

The gear-train of the torque transfer system may include an external ring gear. In such an embodiment, the electric motor may be operatively connected to and configured to apply the electric motor torque input to the external ring gear.

The torque transfer system may include a tone ring, a.k.a., a speed sensor gear. In such an embodiment, the electric motor may be operatively connected to and configured to apply the electric motor torque input to the tone ring.

The electrified multiple speed ratio transmission may be an electrified continuously variable transmission (ECVT).

The electrified multiple speed ratio transmission may also include a transfer gear-set or a transfer chain mechanism arranged between the electric motor and the torque transfer system, and configured to transmit electric motor torque input from the electric motor to the torque transfer system.

The electrified multiple speed ratio transmission may additionally include a reduction gear-set arranged between the electric motor and one of the transfer gear-set and the transfer chain mechanism.

The electrified multiple speed ratio transmission may include an interlocking device configured to selectively connect the electric motor to the torque transfer system and thereby apply the electric motor torque input to the torque transfer system.

The input member may be configured to rotate about a first axis, and the electric motor may be arranged on a second axis that is parallel to the first axis.

The output member may be configured to rotate about the first axis.

The electrified multiple speed ratio transmission may be an electrified automatically-shiftable transaxle. In such an embodiment, the output member may be configured to rotate about a third axis that is parallel to the first axis.

The gear-train of the torque transfer system may include an external gear. In such an embodiment, the electric motor may be operatively connected to and configured to apply the electric motor torque input to the external gear.

A vehicle employing the above-discussed electrified multiple speed ratio transmission mounted externally to a power-source and configured to transmit a power-source torque is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
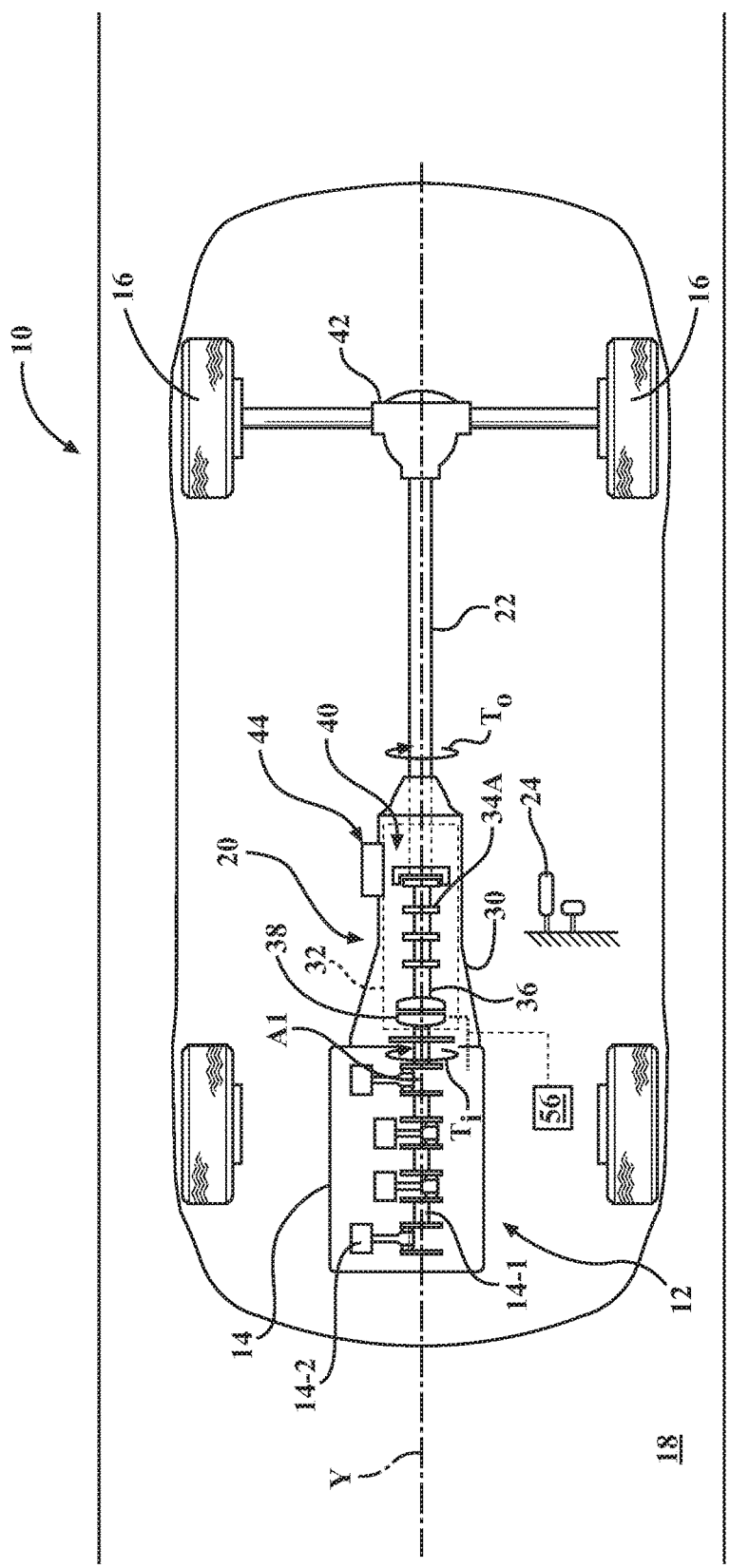
FIG. 1 is a schematic illustration of a vehicle employing a longitudinal powertrain that includes an internal combustion engine connected to an electrified automatic transmission, according to the disclosure.
Figure 2:
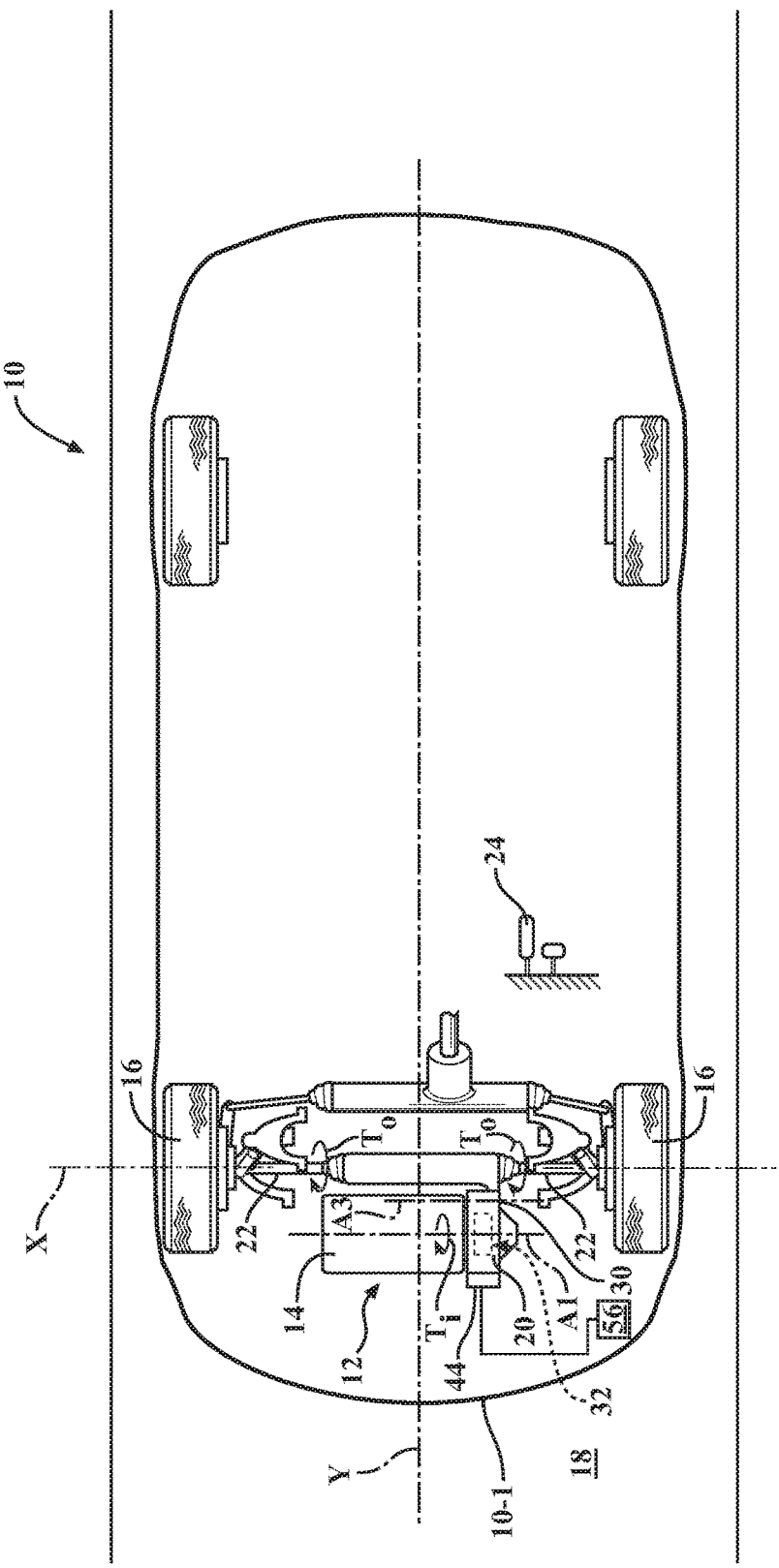
FIG. 2 is a schematic illustration of a vehicle employing a transverse powertrain that includes an internal combustion engine connected to an electrified automatic transmission, according to the disclosure.
Figure 3:
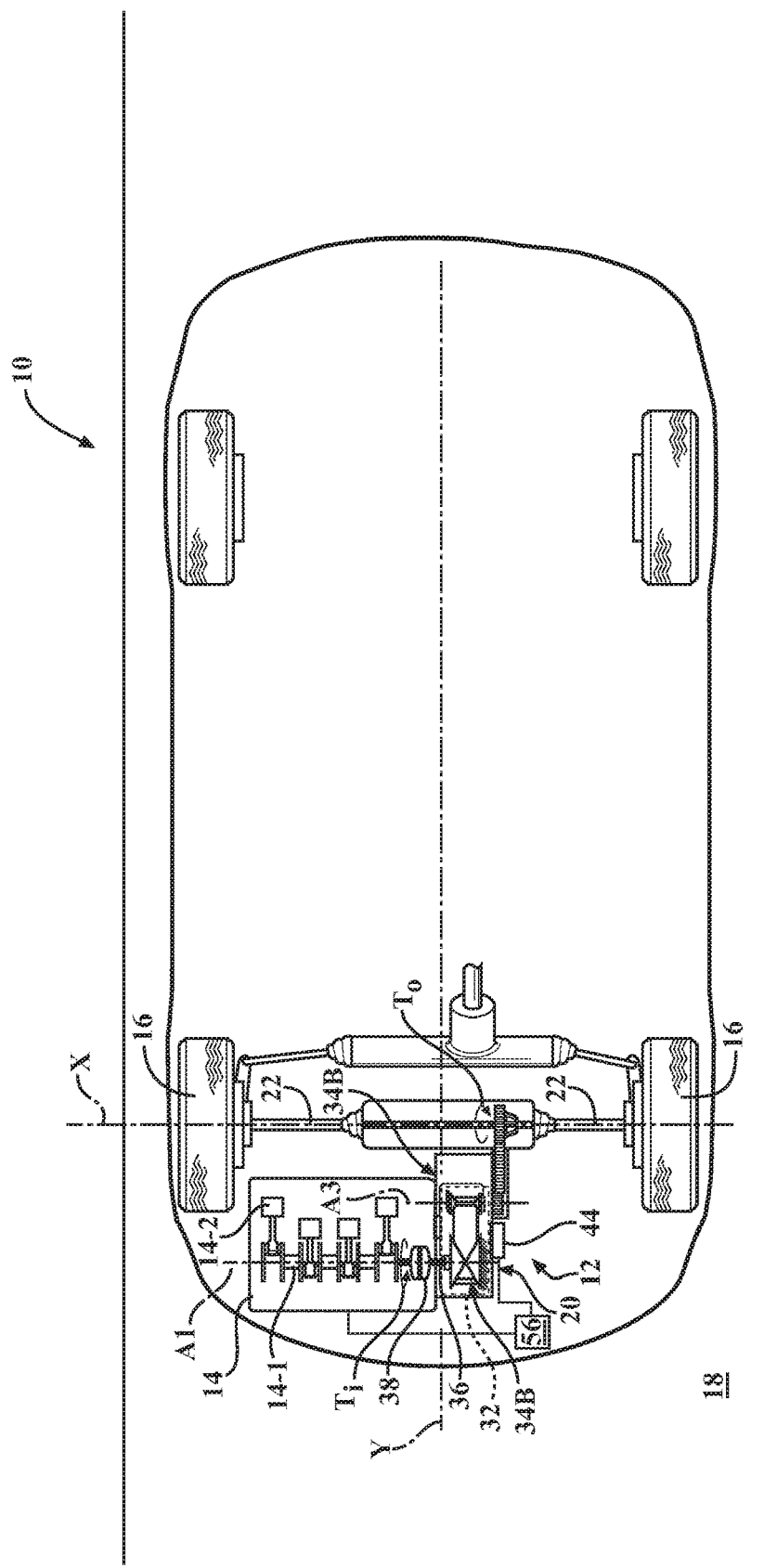
FIG. 3 is a schematic illustration of a vehicle employing a transverse powertrain that includes an internal combustion engine connected to an electrified continuously variable transmission (ECVT), according to the disclosure.

Referring to FIGS. 1-3, a vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure.

The powertrain 12 includes a power-source 14 configured to generate torque $T_i$ (shown in FIGS. 1-7) for propulsion of the vehicle 10 via driven wheels 16 relative to a road surface 18. The powertrain 12 also includes an electrified multiple speed ratio automatically-shiftable, a.k.a., automatic, transmission 20. The powertrain 12 may be mounted transversely in the vehicle 10 along a general axis X, i.e., at approximately 90 degrees relative to a longitudinal axis Y of the vehicle, wherein the transmission 20 is configured as a transaxle—a transmission combined with a differential or final-drive assembly. Such a transverse mounting of the powertrain 12 is frequently employed for packaging purposes in front-wheel-drive (FWD) vehicles, where the driven road wheel(s) 16 are arranged proximate a front end 10-1 of the vehicle 10. Alternatively, the powertrain 12 may be mounted longitudinally in the vehicle 10, along the Y axis. Such a longitudinal mounting of the powertrain 12 is frequently employed in rear-wheel-drive (RWD) or four-wheel-drive (4WD) vehicles.

In some vehicle configurations, the powertrain 12 may be mounted longitudinally in the vehicle 10, i.e., substantially aligned with the longitudinal axis X of the vehicle. In other vehicle configurations, the powertrain 12 may be mounted transversely in the vehicle 10, i.e., at approximately 90 degrees relative to the longitudinal axis X of the vehicle. Such a transverse mounting of the powertrain 12 is frequently employed for packaging purposes in front-wheel-drive (FWD) vehicles, where the drive wheel(s) 16 are arranged proximate a front end of the vehicle 10. In such vehicle configurations, the automatic transmission 20 may be combined with a final drive assembly and is generally described as a transaxle. Although the longitudinal transmission embodiment of the automatic transmission 20 is specifically referred to below, the disclosure is also applicable to transaxle configurations of the automatic transmission 20.

The automatic transmission 20 is operatively connected to the power-source 14, i.e., externally mounted to the power-source and configured to transfer the torque $T_i$ generated by the power-source to the driven wheels 16. The transmission 20 is further configured to receive and then selectively multiply, reduce, or leave unmodified the torque $T_i$ to achieve a resultant transmission output torque $T_o$ (shown in FIGS. 1-3) for driving the vehicle 10. As shown in FIGS. 1-3, the driven wheels 16 may be operatively connected to the transmission 20, such as via drive- or half-shaft(s) 22, and configured to receive the transmission output torque $T_o$. A vehicle accelerator 24, such as a pedal or a lever, is provided for the vehicle operator to control the power-source torque $T_i$ for driving the vehicle 10.

The power-source 14 may include an internal combustion engine, a fuel-cell, and/or an electric motor (not shown) mounted in the vehicle 10 and having the automatic transmission 20 mounted externally thereto. However, for conciseness and clarity, the present disclosure will concentrate on the embodiment of the power-source 14 that includes solely the internal combustion engine. Accordingly, although the numeral 14 should be seen as generally attributable to such embodiments of the envisioned powertrain, for the remainder of the present disclosure, the numeral 14 will be used to denote the specific embodiment of the powertrain having solely the internal combustion engine. As such, the power-source input torque $T_i$ will be hereinafter referenced as engine 14 torque. As shown, the particular engine 14 may include a crankshaft 14-1 for converting reciprocal motion of its pistons 14-2 into rotational motion and generating the input torque $T_i$.

Figure 4:
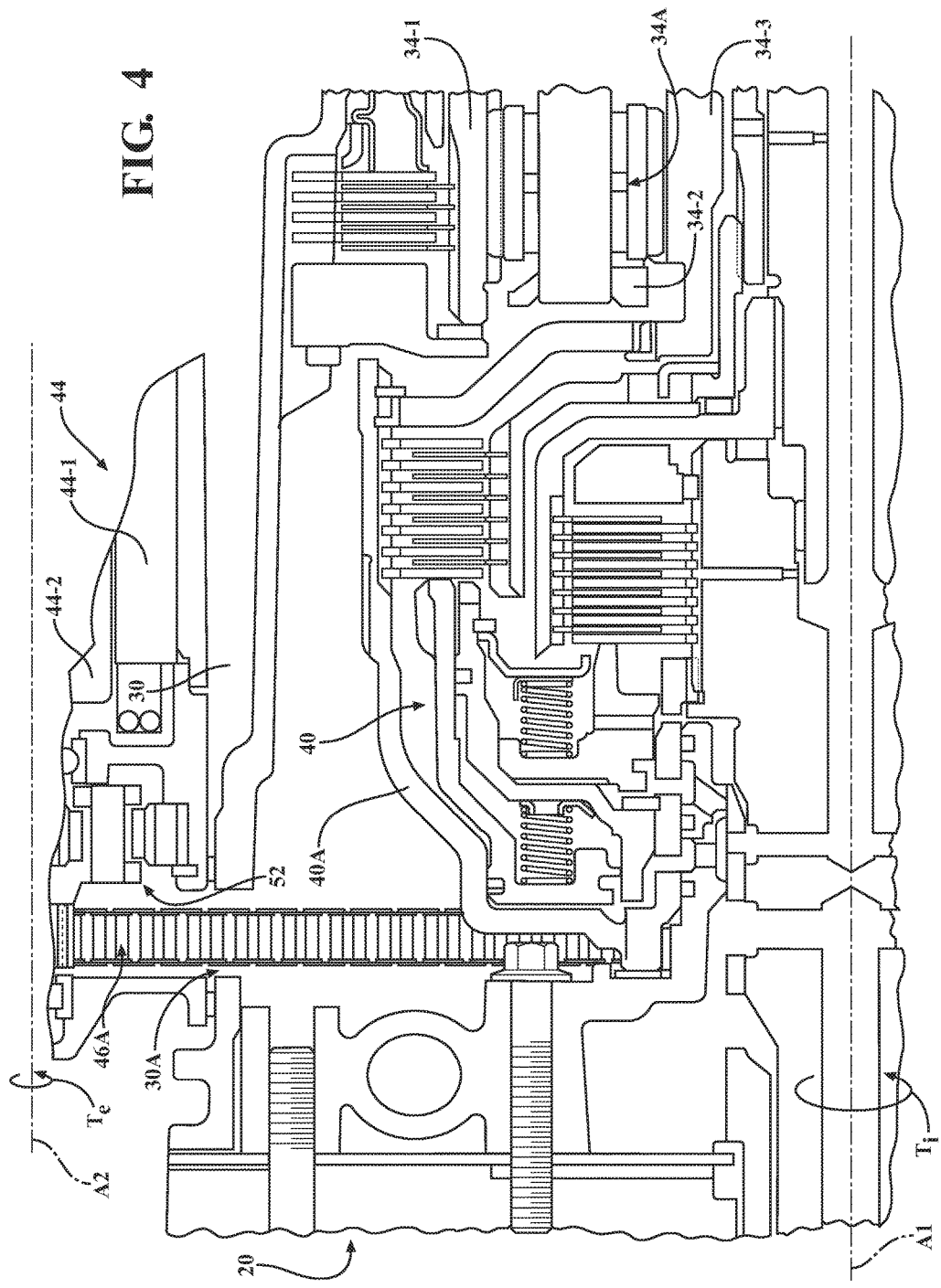
FIG. 4 is a schematic close-up cross-sectional plan view of an embodiment of the electrified automatic transmission shown in FIGS. 1 and 2.
Figure 5:
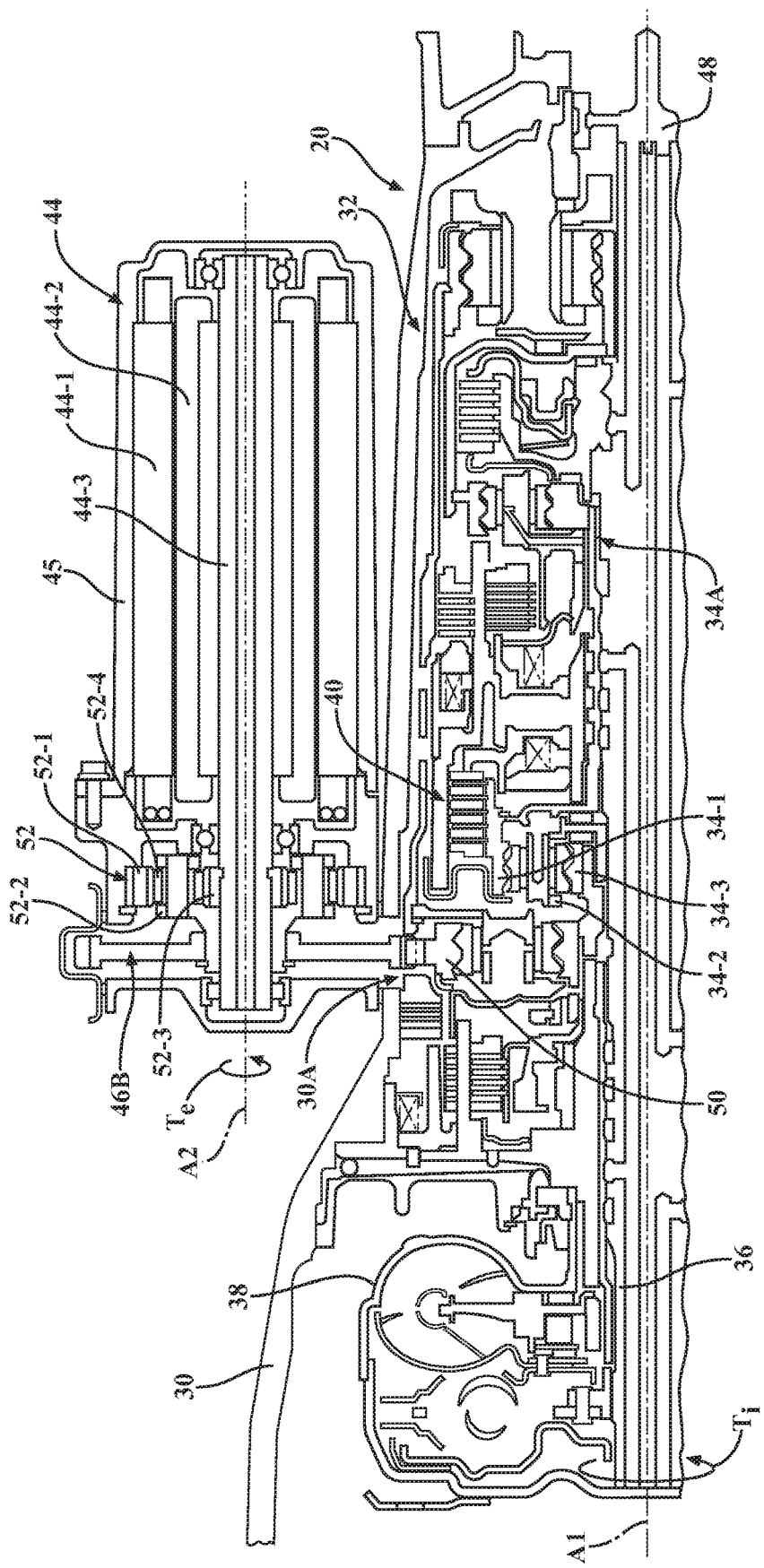
FIG. 5 is a schematic close-up cross-sectional plan view of another embodiment of the electrified automatic transmission shown in FIGS. 1 and 2.
Figure 6:
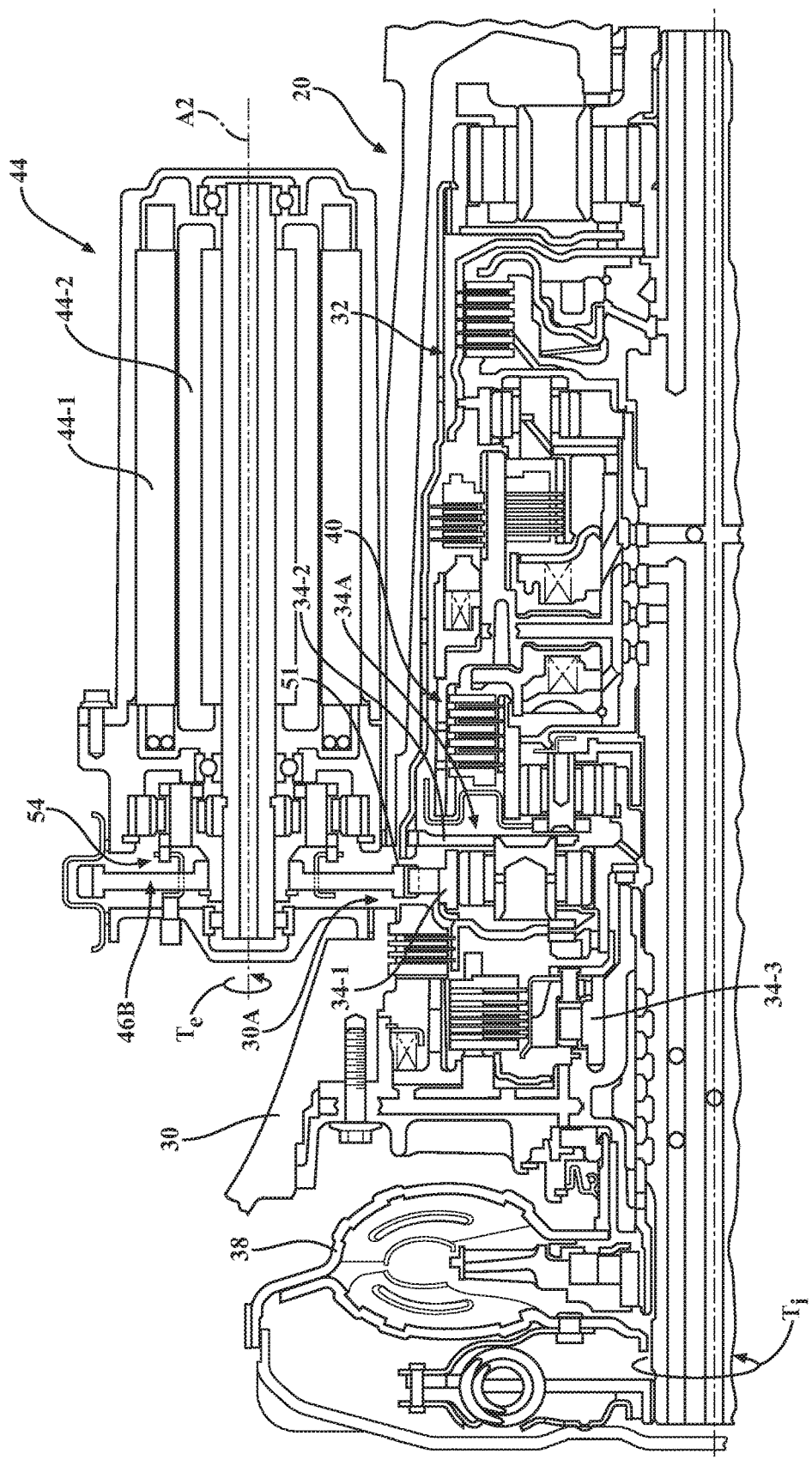
FIG. 6 is a schematic close-up cross-sectional plan view of yet another embodiment of the electrified automatic transmission shown in FIGS. 1 and 2.

As shown in FIGS. 4-6, the transmission 20 includes a transmission housing or case 30 for retaining a torque transfer system 32 for operatively connecting the engine crankshaft to the drive wheels 16. The torque transfer system 32 is configured to receive the power-source input torque $T_i$ and select an input-to-output speed ratio of the transmission 20. As used herein, the term "torque transfer system" includes each component in a torque path within the transmission 20. Accordingly, the torque transfer system 32 generally includes components configured to receive and/or transmit the input torque $T_i$ or the output torque $T_o$ within the transmission 20, as well as operatively interconnected and arranged along a torque path centerline or one of the axes thereof. As shown in FIGS. 4-6, the torque transfer system 32 may include a gear-train 34A, which is arranged along the transmission 20 torque path centerline depicted as a first axis A1. The gear-train 34A includes a number of gear elements, for example one or more planetary or epicyclic gear-sets (shown in FIGS. 4-6), configured to provide a predetermined number of selectable speed ratios. Alternatively, the transmission 20 may be configured as an electrified continuously variable speed ratio transmission (ECVT), wherein the torque transfer system 32 may include a variable diameter pulley system 34B (shown in FIGS. 3 and 7), configured to provide a continuously variable speed ratio.

In general, a continuously variable transmission (CVT), such as the ECVT embodiment of the transmission 20, is configured to change through an infinite number of effective gear ratios between a maximum speed ratio and a minimum speed ratio. A typical CVT includes two adjustable pulleys, each having two sheaves. A belt or any suitable endless rotatable device, such as a continuous loop cable or chain, typically runs between the two pulleys, with the two sheaves of each of the pulleys sandwiching the belt therebetween. Frictional engagement between the sheaves of each pulley and the belt couples the belt to each of the pulleys to transfer a torque from one pulley to the other. One of the pulleys may function as a drive pulley so that the other pulley can be driven by the drive pulley via the belt. The speed ratio of the CVT is the ratio of the torque of the drive pulley to the torque of the driven pulley. The speed ratio may be changed by moving the two sheaves of one of the pulleys closer together and the two sheaves of the other pulley farther apart, causing the belt to ride higher or lower on the respective pulley.

In each of the embodiments shown in FIGS. 1-3, the transmission 20 is configured to provide a predetermined number of selectable speed ratios or a continuously variable speed ratio, respectively, and for operatively connecting the power-source or engine 14 to the drive wheels 16. The transmission 20 also includes an input member 36, such as an input shaft, configured to receive the engine 14 torque $T_i$ and transfer the subject torque to the torque transfer system 32. As also shown in FIGS. 1-3, the input member 36 is configured to rotate about the first axis A1. The transmission input member 36 may be selectively connectable to the engine 14 through a fluid coupling 38, such as a torque converter. Although the torque transfer system 32 having the gear-train 34A is specifically referred to below, the disclosure not specifically tied to planetary gear-sets is also applicable to the previously described ECVT configuration of the automatic transmission 20.

As shown in FIGS. 4-6, the torque transfer system 32 may also include one or more torque transmitting devices 40, such as clutches and brakes, retained by the transmission housing 30. The gear-train 34A and the torque transmitting device(s) 40 are operatively connected to the input member 36 and are cooperatively configured to select transmission speed ratios to generate a predetermined amount of transmission output torque $T_o$. The transmission speed ratio is generally defined as the transmission input speed divided by the transmission output speed. Shifting from one speed ratio to another is typically performed in response to a position of the vehicle accelerator 24 and assessed vehicle road speed. Shifting between speed ratios generally involves releasing one or more "off-going" torque transmitting devices 40 associated with the current speed ratio, and applying one or more "on-coming" torque transmitting devices 40 associated with the desired speed ratio. The transmission 20 also includes a differential or final-drive assembly 42 configured to transmit the transmission output torque $T_o$ for driving an external load, such as the driven road wheels 16.

With continued reference to FIG. 2, the transmission 20 additionally includes an electric motor 44 operatively connected to the torque transfer system 32 and configured to apply an electric motor torque input $T_e$ (shown in FIGS. 4-7) thereto. Accordingly, the torque transfer system 32 is configured to receive the power-source input torque $T_i$ and the electric motor torque input $T_e$ and output a sum of the power-source torque and the electric motor torque input to drive a load, e.g., the driven road wheels 16. As shown, the electric motor 44 is arranged on a second axis A2 that is parallel to the first axis A1. As shown in FIGS. 4-7, the electric motor 44 includes a motor housing 45 and a stator 44-1 fixed to the motor housing, which is, in turn, fixed to the transmission housing 30. The electric motor 44 also includes a rotor 44-2 (shown in FIGS. 4-7) fixed to a rotor shaft 44-3. The electric motor 44 may be mounted directly to the transmission housing 30.

Figure 7:
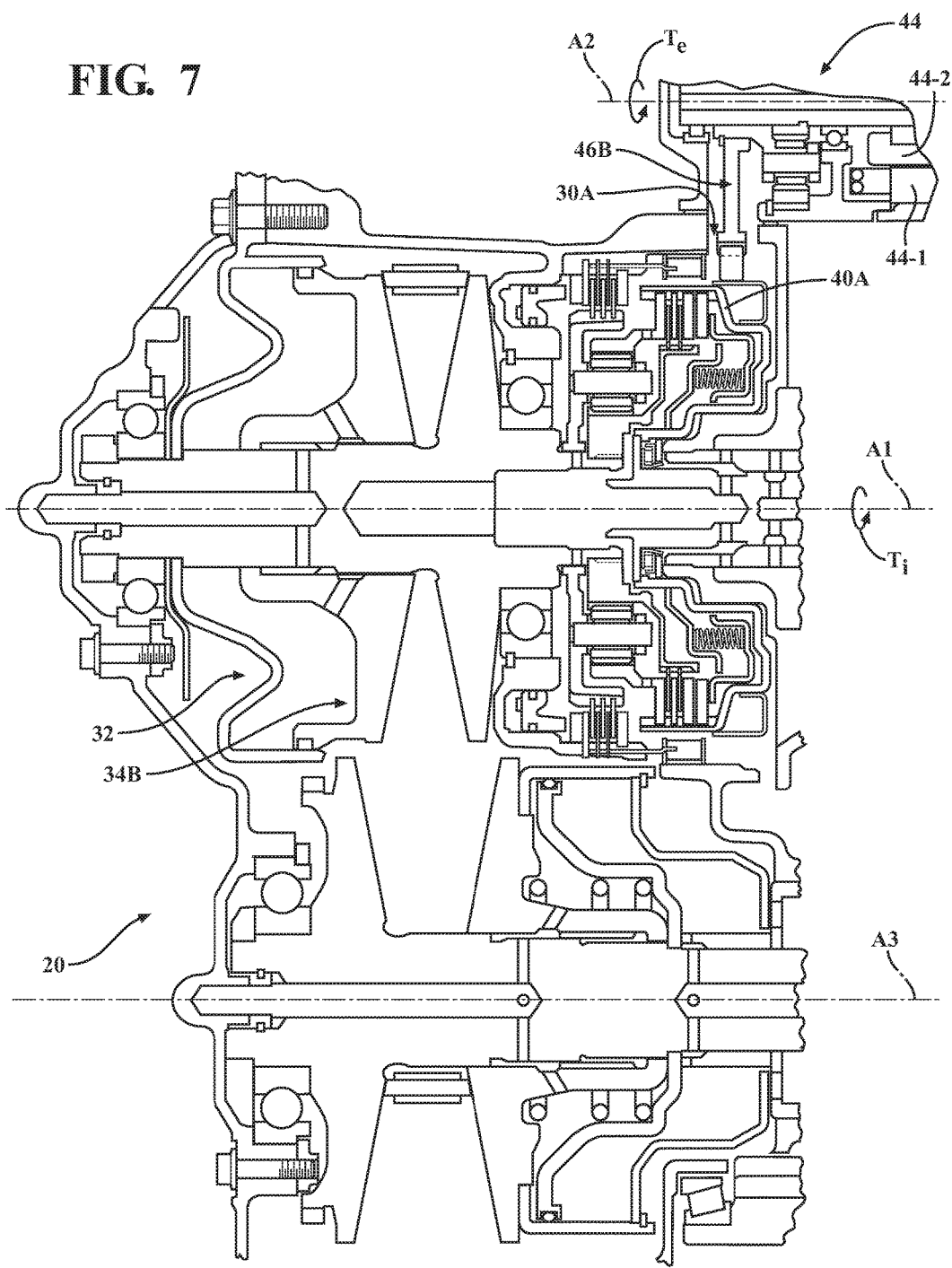
FIG. 7 is a schematic close-up cross-sectional plan view of an embodiment of the ECVT shown in FIG. 3.

As shown in the embodiment of FIG. 4, the electric motor 44 may be operatively connected to the torque transfer system 32, such as to the torque transmitting device housing 40A, via a transfer chain mechanism 46A. The transfer chain mechanism 46A is arranged between the electric motor 44 and the torque transfer system 32 and extends through an aperture 30A defined by the transmission housing 30 proximate the torque transmitting device 40. Alternatively, as shown in FIGS. 5-7, the electric motor 44 may be operatively connected to the torque transmitting device housing 40A via a transfer gear set 46B. Analogously to the embodiment using the transfer chain mechanism 46A, as shown, the transfer gear set 46B is arranged between the electric motor 44 and the torque transfer system 32 and extends through the aperture 30A in the transmission housing 30 proximate the torque transmitting device 40.

As shown in FIGS. 4-6, the torque transfer system 32 having the gear-train 34A may include a first planetary gear-set member 34-1, a second planetary gear-set member 34-2, and a third planetary gear-set member 34-3. According to the disclosure, the first member 34-1 may be a ring gear, the second member 34-2 may be a planetary carrier supporting a plurality of pinion gears, and the third member 34-3 may be a sun gear. The transmission 20 also includes an output member 48 such as an output shaft. The output member 48 is operatively connected to the torque transfer system 32 and is configured to rotate about the first axis A1 (shown in FIG. 1) or about a third axis A3 that is arranged in parallel with the first axis A1 (shown in FIGS. 2 and 3). The transmission input member 36 may be in mesh with one of the first, second, and third members 34-1, 34-2, 34-3, while the output member 48 may be in mesh with one of the other of the first, second, and third members 34-1, 34-2, 34-3. The input and output members 36, 48 are also arranged along the first axis A1, i.e., the transmission 20 centerline. The electric motor 44 may be operatively connected to the torque transfer system 32 at any point between and inclusive of the input member 36 and the output member 48. Accordingly, the output member 48 is configured to receive the power-source input torque $T_i$ and the electric motor torque input $T_e$, and output a sum of the power-source torque and the electric motor torque input as the transmission output torque $T_o$ to drive a load.

In a specific embodiment of the transmission 20 shown in FIGS. 4 and 7, the torque transmitting device 40 may include a torque transmitting device housing 40A. In such an embodiment, as shown in FIG. 7 with respect to the ECVT example of the transmission 20, the electric motor 44 may be operatively connected to and configured to apply the electric motor torque input $T_e$ to the torque transmitting device housing 40A. Alternatively, although not shown, the electric motor 44 may be operatively connected to and configured to apply the electric motor torque input $T_e$ to any component of the torque transfer system 32 arranged along the third axis A3. In another embodiment of the transmission 20 shown in FIG. 5, the torque transfer system 32 may include gear teeth fixed to the particular transmission 20 components engaging within the proximity of the transmission housing 30, such as on the outer diameter of a torque transmitting device housing 40A, or either of the pulleys of the variable diameter pulley system 34B in the ECVT embodiment. The torque transfer system 32 may also include a gear 50. The gear 50 may be configured as a straight cut or helical tooth gear, or as a tone ring, a.k.a., a speed sensor gear. In general, a tone ring is used in conjunction with a Hall effect sensor or a transducer that varies its output voltage in response to a magnetic field. In vehicle powertrains, such as the powertrain 12, Hall effect sensors are frequently used to time speeds of wheels and shafts for open- and closed-loop control of powertrain functions. In such an embodiment, the electric motor 44 may be operatively connected to and configured to apply the electric motor torque input $T_e$ to the tone ring gear 50. To handle the electric motor torque input $T_e$, the tone ring gear 50 may be configured as a suitably robust gear.

The gear 50, whether configured as a straight cut or helical tooth gear or as a tone ring, may be part of the gear-train 34A shown in each of the embodiments of FIGS. 1 and 2, or as part of the torque transfer system 32 in the embodiment shown in FIG. 3. Wherein the gear 50 is used in the gear-train 34A in lieu, i.e., instead, of a tone ring, depending on the point of connection between the electric motor 44 and the torque transfer system 32, the electric motor may be used to provide a signal indicative of the input and/or output speed of the of the transmission 20. In a yet another embodiment of the transmission 20 shown in FIG. 6, the gear-train 34A of the torque transfer system 32 may include an external gear 51, such as an external ring gear. In such an embodiment, the electric motor 44 may be operatively connected to and configured to apply the electric motor torque input $T_e$ to the external gear 51. For example, the external gear 51 may be arranged on or be an integral part of the first member 34-1 of the gear-train 34A, as shown in FIG. 6.

As shown in FIG. 5, the transmission 20 may also include a reduction gear-set 52 arranged between the electric motor 44 and the transfer gear-set 46B or between the electric motor 44 and the transfer chain mechanism 46A, such as at or near the main shaft on the first axis A1, (not shown, but understood based on the previous description of the transfer chain mechanism with respect to FIG. 4). The reduction gear-set 52 may be arranged on the second axis A2 to operatively connect the torque transfer system 32 to the rotor shaft 44-3 and be configured to generate a speed ratio therebetween. The reduction gear-set 52 may be configured as an epicyclic gear-set (shown in FIG. 5) having a ring gear 52-1 fixed to the motor housing 45, and in turn to the transmission housing 30. The epicyclic reduction gear-set 52 may also include a carrier member 52-2 fixed to a transfer gear 46 of the torque transfer system 32 and supporting a plurality of pinion gears 52-4 in mesh with the rotor shaft 44-3. In such an arrangement, the rotor shaft 44-3 performs the role of a sun gear in the epicyclic reduction gear-set 52 (not shown), or, alternatively, a separate sun gear 52-3 (shown in FIG. 5) may be splined to the rotor shaft.

Accordingly, the electric motor 44 may apply the electric motor torque input $T_e$ via the reduction gear-set 52 to the torque transfer system 32 to assist the engine torque $T_i$ or to provide solely electric propulsion of the vehicle 10. As shown in FIG. 6, the transmission 20 may additionally include an interlocking device 54 configured to selectively connect the rotor shaft 44-3 to the transfer gear 46, and thereby connect the electric motor 44 to the torque transfer system 32. Consequently, the interlocking device 54 is configured to selectively apply the electric motor torque input $T_e$ to the torque transfer system 32. Such an interlocking device 54 may, for example, be configured either as a synchronizer or a dog-clutch.

The transmission 20 may be controlled by a programmable controller 56 to achieve desired propulsion of the vehicle 10 in response to command(s) from an operator of the subject vehicle. Specifically, the controller 56 may be programmed to regulate operation of the torque transmitting devices 40 to select transmission 20 speed ratios, activate the electric motor 44, and engage the interlocking device 54 to generate a predetermined amount of transmission output torque $T_o$. The controller 56 may include a central processing unit (CPU) that regulates various functions on the vehicle 10, or be configured as a powertrain control module (PCM) configured to control the entire powertrain 12, or a dedicated transmission control unit (TCU) for controlling solely the transmission 20. Configured as either a CPU or a PCM for the powertrain 12, the controller 56 may be employed to control and coordinate operation of the power-source 14 and the transmission 20. In either of the above configurations, the controller 56 includes a processor and tangible, non-transitory memory, which includes instructions for operation of the transmission 20 programmed therein. The memory may be an appropriate recordable medium that participates in providing computer-readable data or process instructions. Such a recordable medium may take many forms, including but not limited to non-volatile media and volatile media.

Non-volatile media for the controller 56 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 56 may also include a flexible disk, hard disk, magnetic tape, another magnetic medium, a CD-ROM, DVD, another optical medium, etc. The controller 56 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 56 or accessible thereby may be stored in the memory and automatically executed to provide the required functionality of the transmission 20.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electrified multiple speed ratio transmission for mounting to an external power-source and transmitting a power-source torque therefrom, the transmission comprising:
an input member configured to receive the power-source torque and rotate about a first axis;
a transmission housing configured to retain and support the torque transfer system and defining an aperture located radially relative to the first axis;
a torque transfer system configured to receive the power-source torque from the input member and select an input-to-output speed ratio of the transmission;
an electric motor mounted externally to the transmission housing and arranged on a second axis that is parallel to the first axis, wherein the electric motor is operatively connected to the torque transfer system and configured to apply an electric motor torque input to the torque transfer system through the aperture; and
an output member operatively connected to the torque transfer system and configured to receive the power-source torque and the electric motor torque input flowing through the torque transfer system and output a sum of the power-source torque and the electric motor torque input to drive a load.

2. The electrified multiple speed ratio transmission according to claim 1, wherein the torque transfer system includes a gear-train and a torque transmitting device having a torque transmitting device housing, and wherein the electric motor is operatively connected to and configured to apply the electric motor torque input to the torque transmitting device housing.

3. The electrified multiple speed ratio transmission according to claim 2, wherein the gear-train of the torque transfer system includes an external gear, and wherein the electric motor is operatively connected to and configured to apply the electric motor torque input to the external gear.

4. The electrified multiple speed ratio transmission according to claim 1, wherein the torque transfer system includes a tone ring, and wherein the electric motor is operatively connected to and configured to apply the electric motor torque input to the tone ring.

5. The electrified multiple speed ratio transmission according to claim 1, wherein the electrified multiple speed ratio transmission is an electrified continuously variable transmission (ECVT).

6. The electrified multiple speed ratio transmission according to claim 1, further comprising one of a transfer gear-set and a transfer chain mechanism configured to transmit the electric motor torque input from the electric motor to the torque transfer system.

7. The electrified multiple speed ratio transmission according to claim 6, further comprising a reduction gear-set arranged between the electric motor and one of the transfer gear-set and the transfer chain mechanism.

8. The electrified multiple speed ratio transmission according to claim 1, further comprising an interlocking device configured to selectively connect the electric motor to the torque transfer system and thereby apply the electric motor torque input to the torque transfer system.

9. A vehicle comprising:
a power-source configured to generate a power-source torque;
an electrified multiple speed ratio transmission mounted externally to the power-source and configured to transmit the power-source torque; and
a road wheel configured to receive the power-source torque transmitted by the electrified multiple speed ratio transmission;
wherein the electrified multiple speed ratio transmission includes:
an input member configured to receive the power-source torque and rotate about a first axis;
a transmission housing configured to retain and support the torque transfer system and defining an aperture located radially relative to the first axis;
a torque transfer system configured to receive the power-source torque from the input member and select an input-to-output speed ratio of the transmission;
an electric motor mounted externally to the transmission housing and arranged on a second axis that is parallel to the first axis, wherein the electric motor is operatively connected to the torque transfer system and configured to apply an electric motor torque input to the torque transfer system through the aperture;
an output member operatively connected to the torque transfer system and configured to receive the power-source torque and the electric motor torque input flowing through the torque transfer system and output a sum of the power-source torque and the electric motor torque input; and
a differential assembly operatively connected to the output member to thereby transmit the sum of the power-source torque and the electric motor torque input to drive the road wheel.

10. The vehicle according to claim 9, wherein the torque transfer system includes a gear-train and a torque transmitting device having a torque transmitting device housing, and wherein the electric motor is operatively connected to and configured to apply the electric motor torque input to the torque transmitting device housing.

11. The vehicle according to claim 10, wherein the gear-train of the torque transfer system includes an external gear, and wherein the electric motor is operatively connected to and configured to apply the electric motor torque input to the external gear.

12. The vehicle according to claim 9, wherein the torque transfer system includes a tone ring, and wherein the electric motor is operatively connected to and configured to apply the electric motor torque input to the tone ring.

13. The vehicle according to claim 9, wherein the electrified multiple speed ratio transmission is an electrified continuously variable transmission (ECVT).

14. The vehicle according to claim 9, wherein the electrified multiple speed ratio transmission additionally includes one of a transfer gear-set and a transfer chain mechanism configured to transmit the electric motor torque input from the electric motor to the torque transfer system.

15. The vehicle according to claim 14, wherein the electrified multiple speed ratio transmission additionally includes a reduction gear-set arranged between the electric motor and one of the transfer gear-set and the transfer chain mechanism.

16. The vehicle according to claim 9, wherein the electrified multiple speed ratio transmission additionally includes an interlocking device configured to selectively connect the electric motor to the torque transfer system and thereby apply the electric motor torque input to the torque transfer system.

* * * * *